US012773831B2

(12) United States Patent
Plante et al.

(10) Patent No.: US 12,773,831 B2
(45) Date of Patent: Oct. 27, 2026

(54) METHOD AND EQUIPMENT FOR PRODUCING A PART BY INJECTING RESIN INTO A WOVEN FIBER PREFORM

(71) Applicant: SAFRAN AIRCRAFT ENGINES, Paris (FR)

(72) Inventors: Romain Plante, Moissy-Cramayel (FR); Sylvain Corradini, Moissy-Cramayel (FR); Marc-Emmanuel Jean François Techer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 501 days.

(21) Appl. No.: 16/628,641

(22) PCT Filed: Jul. 5, 2018

(86) PCT No.: PCT/EP2018/068311
§ 371 (c)(1),
(2) Date: Jan. 3, 2020

(87) PCT Pub. No.: WO2019/008125
PCT Pub. Date: Jan. 10, 2019

(65) Prior Publication Data

US 2020/0215769 A1 Jul. 9, 2020

(30) Foreign Application Priority Data

Jul. 7, 2017 (FR) ...................................... 1756425

(51) Int. Cl.
*B29C 70/48* (2006.01)
*B29C 70/54* (2006.01)
(Continued)

(52) U.S. Cl.
CPC ............ *B29C 70/48* (2013.01); *B29C 70/548* (2013.01); *B29K 2063/00* (2013.01); *B29K 2307/04* (2013.01); *B29K 2713/00* (2013.01)

(58) Field of Classification Search
CPC . B29C 70/48; B29C 70/548; B29C 2045/565; B29C 70/467
(Continued)

(56) References Cited

U.S. PATENT DOCUMENTS 5,427,726 A * 6/1995 White ...................... C08J 5/249 264/137
7,101,154 B2 * 9/2006 Dambrine ............... B29C 70/48 442/205
(Continued)

FOREIGN PATENT DOCUMENTS

FR 3002477 A1 8/2014

OTHER PUBLICATIONS

English Translation of Nishida (JP4414801B) (Year: 2004).*
(Continued)

*Primary Examiner* — Michael A Tolin
*Assistant Examiner* — Hana C Page
(74) *Attorney, Agent, or Firm* — CHRISTENSEN O'CONNOR JOHNSON KINDNESS PLLC

(57) ABSTRACT

A method for producing a part by injecting resin into a woven fiber preform includes the steps of (a) shaping the preform, (b) forming the preform, and (c) injecting resin into the preform. The step of injecting resin into the preform is carried out by means of equipment that includes a mold, a countermold, and resin injecting means. The step of injecting resin into the preform includes the substeps of: partially opening the equipment, injecting resin into the equipment,
(Continued)

closing the equipment, and pressurizing and heating the impregnated preform between the mold and the counter-mold.

9 Claims, 4 Drawing Sheets

(51) Int. Cl.
*B29K 63/00* (2006.01)
*B29K 307/04* (2006.01)

(58) Field of Classification Search
USPC .......................................................... 264/511
See application file for complete search history.

(56) References Cited

U.S. PATENT DOCUMENTS

| | | | | |
|---|---|---|---|---|
| 8,382,924 | B2 * | 2/2013 | Whitworth | B32B 38/10 156/289 |
| 9,381,675 | B2 * | 7/2016 | Tsotsis | B29B 11/16 |
| 11,292,214 | B2 * | 4/2022 | Otsuki | B29C 70/48 |
| 2002/0121720 | A1 * | 9/2002 | Davies | B29C 70/24 264/129 |
| 2007/0092379 | A1 | 4/2007 | Coupe et al. | |
| 2011/0204545 | A1 * | 8/2011 | Tanner | C08J 5/121 264/250 |
| 2015/0343717 | A1 * | 12/2015 | Graf | B29C 70/545 425/500 |
| 2016/0176124 | A1 * | 6/2016 | Tranquart | B29B 11/16 264/103 |
| 2016/0288380 | A1 * | 10/2016 | Marchal | B29B 13/06 |
| 2017/0232690 | A1 * | 8/2017 | Techer | B29C 70/48 264/40.1 |
| 2019/0255738 | A1 * | 8/2019 | Risicato | B29B 11/16 |

OTHER PUBLICATIONS

English translation of Techer (FR3026340A1) (Year: 2016).*

Ruiz (Characterization, Analysis and Design Of Rtm Process, The 10th International Conference on Flow Processes in Composite Materials (FPCM10) Monte Verità, Ascona, CH—Jul. 11-15, 2010). (Year: 2010).*

Lee ("Resin Transfer Molding (RTM) Process of a High Performance Epoxy Resin II: Effects of Process Variables on the Physical, Static, and Mechanical Behavior," Polymer Engineering and Science, Apr. 2000, vol. 40, No. 4). (Year: 2000).*

CYCOM® PR 520 RTM Technical Data Sheet (Hereinafter Referred to as TDS, Publicly Available on Mar. 19, 20212), (Year: 2012).*

Epotek (Available 2012). (Year: 2012).*

Written Opinion of the International Searching Authority mailed Sep. 7, 2018, issued in corresponding International Application No. PCT/EP2018/068311, filed Jul. 5, 2018, 5 pages.

International Preliminary Report on Patentability mailed Jan. 7, 2020, issued in corresponding International Application No. PCT/EP2018/068311, filed Jul. 5, 2018, 1 page.

International Search Report mailed Sep. 7, 2018, issued in corresponding International Application No. PCT/EP2018/068311, filed Jul. 5, 2018, 7 pages.

Written Opinion of the International Searching Authority mailed Sep. 7, 2018, issued in corresponding International Application No. PCT/EP2018/068311, filed Jul. 5, 2018, 6 pages.

* cited by examiner

METHOD AND EQUIPMENT FOR PRODUCING A PART BY INJECTING RESIN INTO A WOVEN FIBER PREFORM

FIELD OF THE DISCLOSURE

Embodiments of the present disclosure relate to a method and an item of equipment for producing a part by injecting resin in a woven fiber preform.

BACKGROUND

A part, in particular of a turbine engine, such as a fan blade, can be produced by injecting a resin in a woven fiber preform. This molding method called RTM (Resin Transfer Molding) is a production method well-known from the state of the art consisting of placing a fibrous preform comprising at least one dry material outer wall in a sealed cavity of an item of equipment, and to fill this cavity with an impregnating resin, generally an epoxy resin.

The outer wall of the preform, or the preform in its entirety, is generally produced by weaving composite fibers such as carbon fibers.

FIG. 1*a* represents the different steps of a method for producing a part of the abovementioned type according to current techniques. The method essentially comprises six steps, which are:

1) producing the preform by three-dimensional (3D) weaving, the fiber preform coming out of a weaving loom being flat and expanded,
2) sizing the preform, by cutting in particular, floats,
3) shaping the preform, by positioning the preform on a shaping support, this support forming a first item of equipment 10,
4) forming the preform, by humidifying the preform and forming in a mold of a second item of equipment 10', and
5) molding by injecting in a mold of a third item of equipment 10".

In the current techniques, steps 3 to 5 specific to the RTM method are therefore carried out by means of three separate items of equipment, which makes producing a part by RTM method complex and long. Such a configuration is described or mentioned in documents US-2015/343.717-A1 and FR-3.002.477-A1.

The molding step 5 is carried out as follows (see FIG. 1*b*). The molding equipment comprises a mold defining a first cavity and a countermold defining a second cavity, the molds and countermold being intended to be interlocked with one another such that the cavities thereof define the abovementioned cavity for receiving the preform and injecting the resin. The preform is positioned in the cavity of the mold (step 5a). The equipment is closed using a press in view of compacting the preform in the cavity (step 5b). Pipes are connected to the equipment and to a piston for injecting the resin (step 5c). The vacuum is made in the cavity (step 5d) and the resin is introduced in the piston then injected by the piston in the cavity of the equipment (step 5e). The press is heated and makes it possible to maintain the pressurized preform during the polymerisation of the resin (step 5f). After cooling, the equipment is open, the part is demolded, and the equipment and the devices can be cleaned (step 6).

Moreover, the current art has numerous disadvantages.

Injecting the resin in the cavity is carried out with external equipment (piston or pressure pot, heating resin, pipes, etc.). These are complex means, since injecting must be carried out with precise pressure, temperature and flow setpoints, etc. In addition, there is an increased risk of breakdowns or anomalies. The worst scenario is dangerous: if the resin is heated for too long or too much, an exothermicity can make the piston explode. For each injection, it is necessary to clean the equipment, it is a long operation which exposes operators to resin and acetone vapours. The pipes are connected and unconnected, then disposed of for each part to be produced. The installation time for all of the equipment is long. In order to avoid clamping during the closing of the equipment, preferable paths are favoured during the filling of the cavity, which complexifies the injection strategies. The loss of material leads to a significant excess cost and there is some of the resin which is not distributed in the part since it remains in the equipment (in the piston, in the heater, in the pipes, etc.). The outer piston making it possible to generate injection pressure has a lot of issues in controlling the pressure inside the cavity, in particular at the time when the resin starts to harden. In the case where the resin polymerises quicker in the pipe connecting the piston to the cavity, it could form a plug inside the pipe and leads to an insufficient injection of the resin.

The present disclosure proposes a solution to at least some of the problems above, which is simple, effective and economical.

SUMMARY

Embodiments of the disclosure proposes a method for producing a part by injecting resin into a woven fiber preform, comprising the steps of:

c) shaping the preform,
d) forming the preform, and
e) injecting resin into the preform and molding, step e) being carried out by means of an item of equipment comprising a mold, a countermold and means for injecting resin, characterised in that step e) comprises the substeps of:

e1) partially opening the equipment, by extending the mold from the countermold or vice versa,
e2) injecting resin into the equipment,
e3) closing the equipment, by bringing the mold from the countermold closer together or vice versa, and
e4) pressurizing and heating the impregnated preform between the mold and the countermold.

The partial opening of the equipment makes it possible to facilitate injecting and distributing resin between the mold and the countermold. A sufficient quantity, and without excess, of resin can thus be injected into the equipment to impregnate the preform and fill the cavity defined between the mold and the countermold, according to the final geometry of the part.

Advantageously, which the steps c), d) and e) are carried out by means of the equipment, which is therefore the only equipment used in the method. The mold defines a cavity configured to implement step c), and the equipment further comprises means for suctioning air and injecting resin.

The disclosure is particularly advantageous, as it makes it possible to simplify the method for producing a part by RTM, by limiting the number of items of equipment necessary to a single item of equipment. A single item of equipment is indeed used to carry out the three abovementioned steps, which represents a significant time saving and a reduction of risks of damaging the part during these movements from one item of equipment to another.

The method according to the disclosure can comprise one or more of the following features or steps, taken individually from one another or combined with one another:

the method comprises, before step c), the steps of:

a) producing the preform by weaving fibers, and b) sizing the preform, step c) comprises the substeps of humidifying the preform and positioning the preform in the cavity of the mold, step d) comprises the substeps of closing the equipment and heating and putting the preform under vacuum between the mold and the countermold, the substep of at least partially opening the equipment is carried out by extending the countermold from the mold by a predetermined distance, the mold and the countermold remaining substantially interlocked with one another, the resin is injected through a port of the equipment, and the vacuum is produced by suctioning air through another port of the equipment, the steps are carried out by means of a single item of equipment.

The present disclosure also relates to an item of equipment for implementing the method, according to one of the preceding claims, characterised in that it comprises:

two heating plates, respectively upper and lower, the inner heating plate being integral with a mold comprising a cavity for shaping a preform and the upper heating plate being integral with a countermold comprising another cavity, motorised means for moving plates, preferably in a substantially vertical direction, from an extended position to a position in which the mold and the countermold are interlocked with one another, the motorised means being configured to applying a compression force to the plates in view of pressurizing the preform between the cavities.

Advantageously, the two plates form part of a press of which the lower plate forms a base and the upper plate is mounted sliding in a substantially vertical direction on guiding columns.

The equipment can comprise means for laser projection of the contours of the preform on the cavity of the mold.

DESCRIPTION OF THE DRAWINGS

The disclosure will be best understood, and other details, features and advantages of the disclosure will appear upon reading the following description, given as a non-limiting example in reference to the appended drawings, in which.

DETAILED DESCRIPTION

Figure 1A:
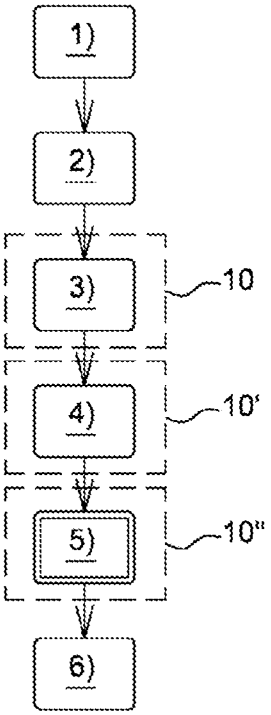
FIG. 1*a* is a block diagram representing steps of a method according to the prior art for producing a part made of composite material.
Figure 1B:
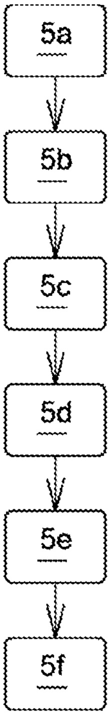
FIG. 1*b* is a block diagram representing steps of a method according to the prior art for molding a part by injecting resin into a woven fiber preform.

FIGS. 1*a* and 1*b* have been described above, and represent a method according to the prior art.

Figure 2A:
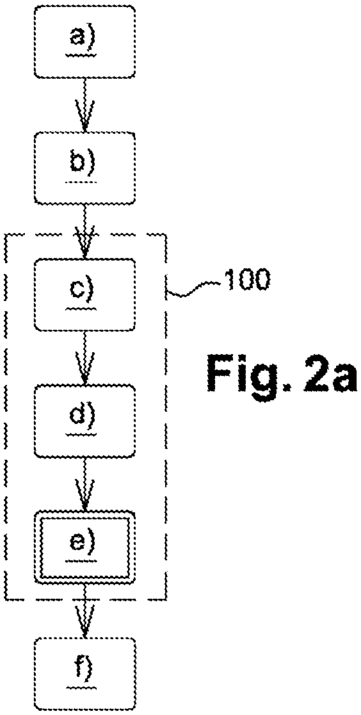
FIG. 2*a* is a block diagram representing steps of a method according to the disclosure for producing a part made of composite material.
Figure 2B:
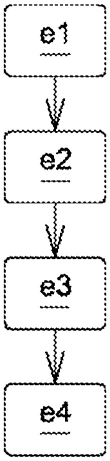
FIG. 2*b* is a block diagram representing steps of a method according to the disclosure for molding a part by injecting resin into a woven fiber preform.

FIGS. 2*a* and 2*b* illustrate a method according to the disclosure for producing a part made of composite material, these steps being preferably carried out by means of the equipment 100 represented in FIG. 3 and below.

The equipment 100 comprises, in the main, a mold 102 integral with a lower plate 104, preferably heating, and a countermold 106 integral with an upper plate 108, also preferably heating. Sealing means are preferably provided between the mold and the countermold. In the example represented, the lower plate 104 forms a base for supporting the equipment, which can, for example, rest on the floor of a production workshop.

Figure 4:
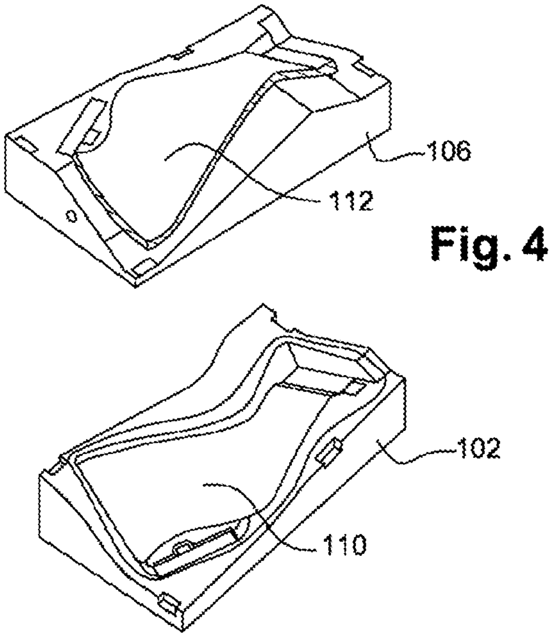
FIG. 4 is a schematic, perspective view of the mold and countermold of the equipment of FIG. 3, and FIGS. 5 to 7 are other schematic views of the equipment of FIG. 3 and illustrate steps of the method.

The mold 102 is situated on an upper face of the plate 104 and comprise a cavity 110, which can best be seen in FIG. 4. In the example represented, the cavity 110 is that of a face of a fan blade, such as the upper side thereof, for example. The cavity 110 here is oriented upwards and faces a cavity 112 of the countermold, which can also best be seen in FIG. 4, the countermold 106 being situated above the mold and facing the latter. The cavity 112 here is that of another face of a fan blade, such as the lower side thereof, for example.

The plate 108 is slidably mounted on guiding columns 114, here two of them, which extend between the lower ends thereof connected to the plate 104 and the upper ends thereof connected to a mast 116. The plate 108 and the countermold 106 are moved in substantially vertical translation by means of an actuator 118 or similar, of which a cylinder is fixed to the mast 116 and of which a piston is connected to the plate 108.

Figure 3:
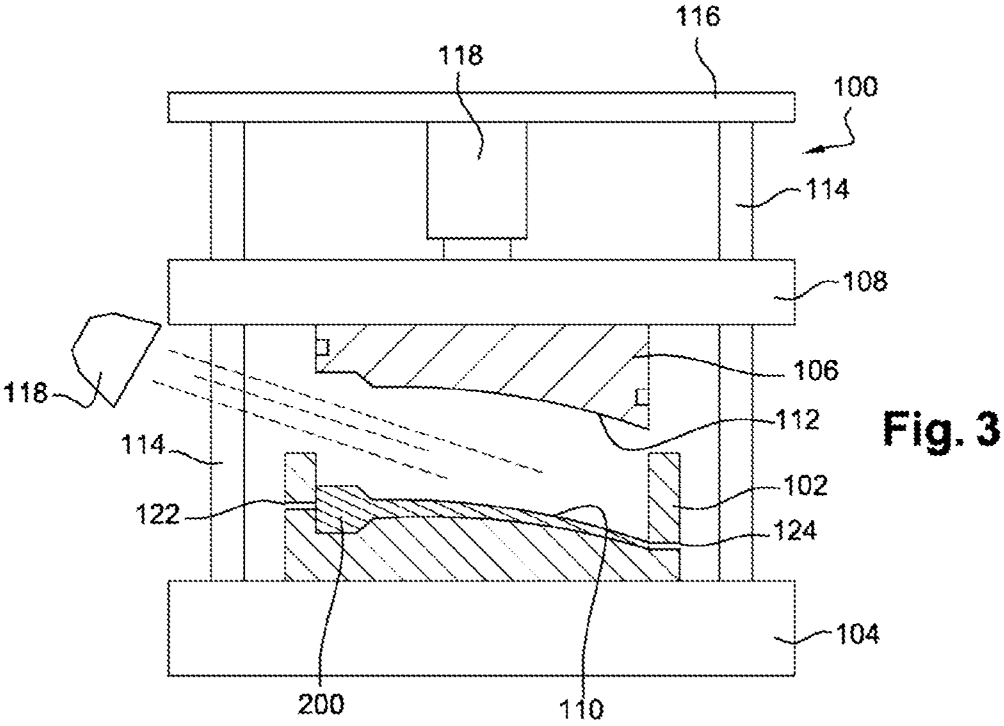
FIG. 3 is a schematic view of an item of equipment for implementing the method of FIGS. 2*a* and 2*b*.

The plate 108 and the countermold 106 are movable from an upper position, represented in FIG. 3, in which the equipment is open and the mold 102 and the countermold 106 are at a distance from one another, and an interlocked or closer together position in which the equipment is closed and the mold and the countermold are engaged in one another, represented in FIG. 3. Intermediate positions can be considered, such as the position of FIG. 6, in which the equipment is open and the mold and the countermold are partially disconnected from one another, the countermold being extended by a predetermined distance from the mold. The equipment 100 is also used to pressurize the preform 200 in the cavity defined by the cavities 110, 112, by a predetermined force applied by the actuator 118 on the plate 108 (arrow 120).

The equipment 100 further comprises means for heating the plates 104, 108, not shown, as well as means for putting under vacuum and supplying the cavity defined by the cavities 110, 112.

The evacuation means comprise a first port 122 localised, for example, in the mold and of which an end opens into the cavity 110. The other cavity of this port 122 is intended to be connected to suction means such as a pump, not shown.

The supply means comprise a second port 124 localised, for example, in the mold and of which an end opens into the cavity 110. The other end of this port 124 is intended to be connected to resin injection means, not shown.

The equipment can further comprise laser projection means 126, in particular, of the contours of the preform 200 on the cavity 110 of the mold, in order to facilitate the positioning thereof at the start of the method.

The different steps of an embodiment of the method according to the disclosure will now be described, from FIGS. 2*a*, 2*b*, 3, 5 and below.

A first step a) of the method consists of producing a preform 200 by three-dimensionally weaving, by means of a weaving loom, for example of the Jacquard type. Coming out of the weaving loom, the preform is raw and has a generally flat shape and is expanded.

A step b) according to the method consists of shaping the preform 200, for example, by cutting its floats.

Steps a) and b) are similar to steps 1) and 2) of the method of the prior art, described in the above.

Step c), as well as the following steps differ from steps 3) and below of the prior art, in that they are implemented by means of the equipment 100 represented in FIGS. 3 and 5 to 7.

FIG. 3 illustrates step c) which consists of shaping the preform 200. For this, the preform is preferably humidified beforehand to make it more malleable. It is placed in the cavity 110 of the mold 102 using laser projection means 126. These projection means make it possible, for example, to correctly position tracers which would be integrated to the preform 200 in predefined positions.

Figure 5:
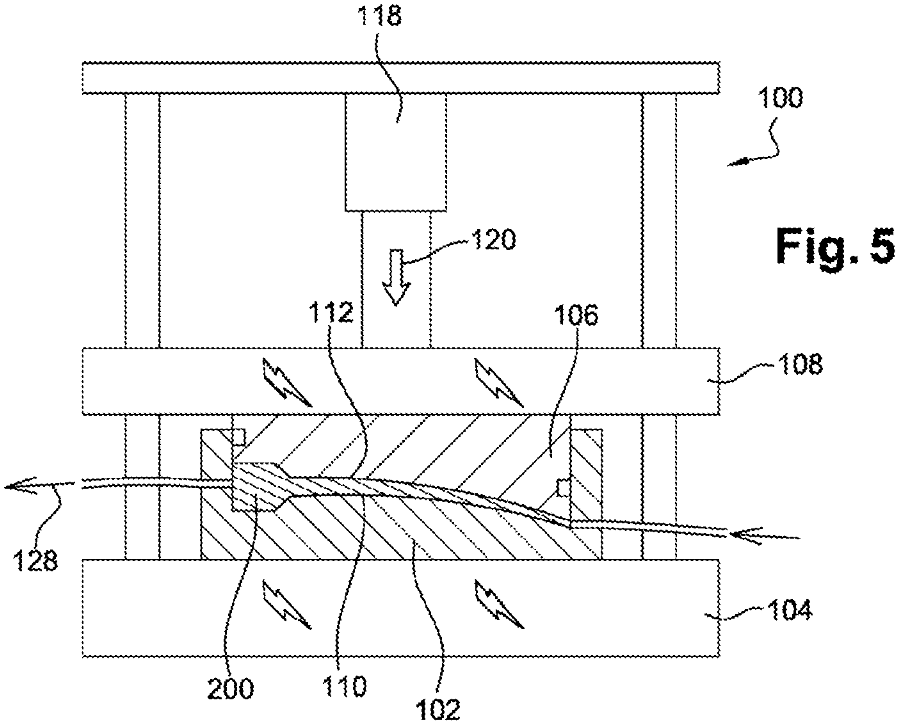

FIG. 5 illustrates step d) which consists of subjecting the preform to a forming. For this, the equipment is closed and pressurized, for example between 5 and 10 bars, then heated, for example, to 100° C., using heating plates 104, 108 and the actuator 118. A residual vacuum is applied in the cavity receiving the preform using suction means, which makes it possible to remove the humidity from it (arrow 128). During this step, the preform is compacted to the final desired geometry, and dried by heating. The preform 200 is thus ready for the injection.

Figure 6:
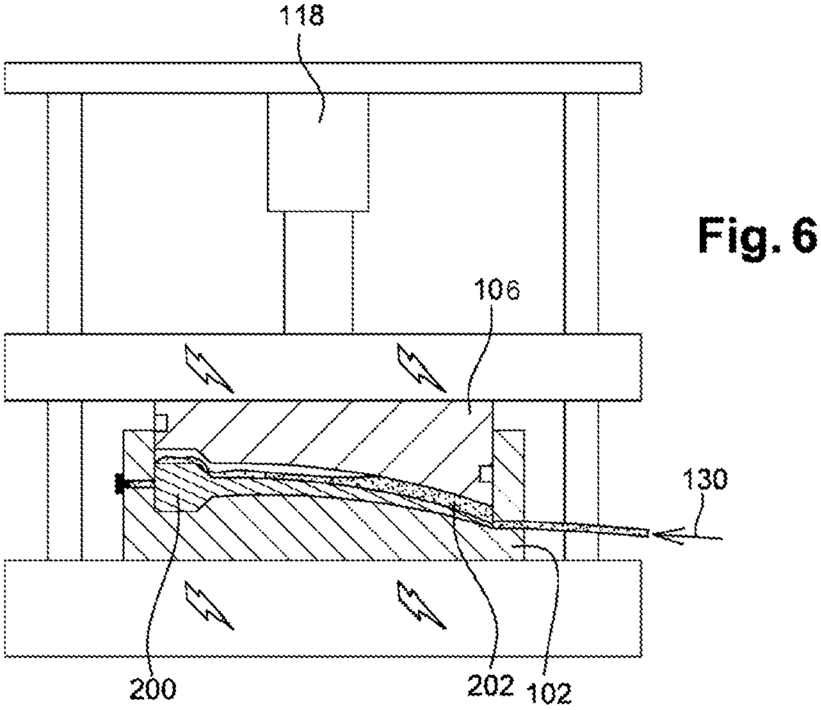
Figure 7:
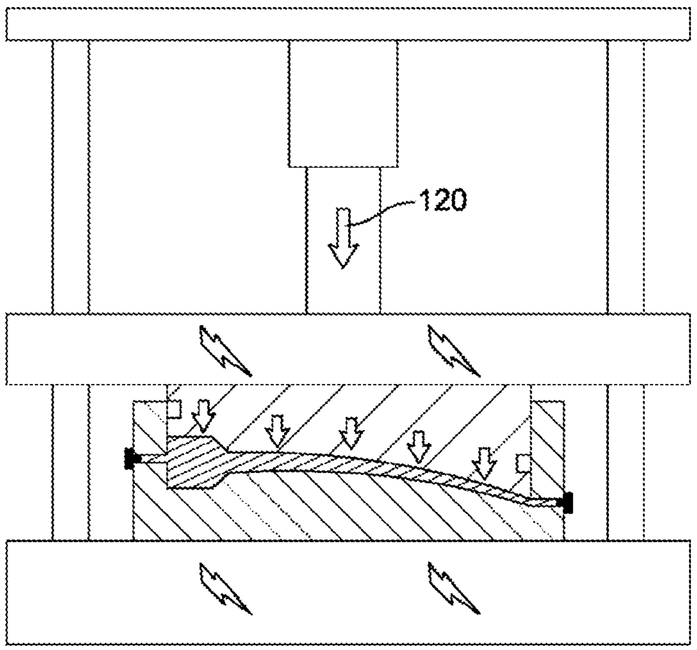

FIGS. 6 and 7 illustrate step e) which consists of injecting the resin 202 into the cavity of the equipment 100. For this, the equipment is partially open (step e1), the countermold being extended from the mold by a predetermined distance, as explained in the above. This makes it possible for the supply of a resin volume, strictly necessary to wet the preform and fill the final geometry of the part (respecting the fiber ratio). During this resin injection operation (arrow 130—step e2), the mold and the countermold are preferably heated, and the resin also.

The equipment is then closed (FIG. 7—step e3) and a pressure of 3 to 10 bars, for example, is applied by the actuator to the preform 200. The temperature can be maintained at 150° C. during the injection and increased to 180° C. for the polymerisation of the resin. As represented in the drawing by means of arrows, the pressure is preferably maintained constant over the whole extent of the part during the polymerisation (step e4).

The resin used is, for example, an epoxy resin such as that known under reference CYCOM PR520®, commercialised by the company CYTEC.

After polymerisation, the equipment 100 is opened, the part 200 is removed and the equipment can be cleaned for a new production operation.

The piston of the prior art, for injecting resin into the equipment, here is replaced by the upper countermold which applies a pressure and makes it possible for the impregnation of the preform with the resin. The resin thus remains under constant and permanent pressure during the polymerisation thereof, which makes it possible to avoid any porosity in the part.

The disclosure can provide several advantages. A correct quantity of resin can be used, which is economical. When pipes are used (for example, copper pipes) with the prior art, the assembly is disposed of after the injection, as the resin hardens inside. With the disclosure, the pipes can be removed, even significantly shortened. A part made of composite material is obtained with the expected dimensions (mold against mold) and with smooth (aerodynamic) surfaces. Fluid, such as water or oil, is not used for the pressurization. Resins which are even more difficult to inject can be used, with increased viscosities. It is possible to have a pressure, which changes during the phase of maintaining the pressure (in particular, in the case of the resin PR520® which can be compressible or have its volume decrease when it polymerises).

The invention claimed is:

1. A method for producing a part by injecting resin into a woven fiber preform, the method comprising the steps of:

shaping the preform;

forming the preform; and injecting resin into the preform by equipment comprising a mold, a countermold, and means for injecting resin, wherein injecting resin into the preform and molding comprises the substeps of:

partially opening the equipment by moving one of the mold and the countermold away from the other of the mold and the countermold;

injecting resin into the equipment;

closing the equipment, by bringing one of the mold and the countermold closer to the other of the mold and the countermold; and pressurizing the impregnated preform between the mold and the countermold and by the mold and the countermold, and heating the impregnated preform between the mold and the countermold and by the mold and the countermold, wherein the step of pressurizing the preform and heating the preform is performed at a pressure of 3 to 10 bars and a temperature of 180° C., wherein the substep of partially opening the equipment is carried out by extending the countermold by a predetermined distance from the mold, the mold and the countermold remaining substantially interlocked with one another in such a way that an external lateral wall of the countermold is in direct contact with an internal lateral wall of the mold, and wherein the substeps of partially opening the equipment, closing the equipment and pressurizing and heating the preform are performed by parts of the equipment comprising:

a mast;

an upper heating plate integral with the countermold and positioned below the mast;

a lower heating plate integral with the mold, the upper and lower heating plates being positioned in such a way that the countermold and mold are localized between the upper and lower heating plates;

two guiding columns connecting the mast, the upper and lower heating plates in such a way that the upper and lower heating plates are movable in a vertical direction on the guiding columns; and a motorized means positioned between the mast and upper heating plate and in the middle of a distance between the two guiding columns, wherein the upper heating plate being moved outwards or towards the lower heating plates by the motorized means so as to perform the opening or closing of the equipment or the pressurizing and heating of the preform.

2. The method according to claim 1, wherein said steps of shaping the preform, forming the preform, and injecting resin into the preform are carried out by means of said equipment, said mold defining a cavity configured to implement the step of shaping the preform, and the equipment further comprising means for suctioning air and injecting resin.

3. The method according to claim 1, further comprising, before the step of shaping the preform, the steps of:

producing the preform by weaving fibers; and sizing the preform.

4. The method according to one claim 1, wherein the step of shaping the preform comprises the substeps of humidifying the preform and positioning the preform in the cavity of the mold.

5. The method according to claim 1, wherein the step of forming the preform comprises the substeps of closing the equipment and heating and putting the preform under vacuum between the mold and the countermold.

6. The method according to claim 1, wherein the resin is injected through a port of the equipment, and a vacuum is produced by suctioning air through another port of the equipment.

7. The method according to claim 1, wherein said steps are carried out by means of a single item of equipment.

8. The method according to claim 1, wherein the step of forming the preform is performed at a temperature of 100° C.

9. The method according to claim 1, wherein the step of injecting the resin is performed at a temperature of 150° C.

* * * * *